US011306586B2

United States Patent
Xu et al.

(10) Patent No.: US 11,306,586 B2
(45) Date of Patent: Apr. 19, 2022

(54) INTELLIGENT DETECTION AND RECOGNITION SYSTEM AND METHOD FOR COAL-ROCK INTERFACE OF MINE

(71) Applicant: China University of Mining and Technology-Beijing, Beijing (CN)

(72) Inventors: Xianlei Xu, Beijing (CN); Suping Peng, Beijing (CN); Zheng Ma, Beijing (CN); Biao Guo, Beijing (CN); Tao Sun, Beijing (CN)

(73) Assignee: China University of Mining and Technology-Beijing, Beijing (CN)

( * ) Notice: Subject to any disclaimer, the term of this patent is extended or adjusted under 35 U.S.C. 154(b) by 0 days.

(21) Appl. No.: 16/897,363

(22) Filed: Jun. 10, 2020

(65) Prior Publication Data

US 2021/0324737 A1   Oct. 21, 2021

(30) Foreign Application Priority Data

Apr. 17, 2020  (CN) .......................... 202010304390.7

(51) Int. Cl.
*E21C 35/24*   (2006.01)
*E21C 31/08*   (2006.01)

(52) U.S. Cl.
CPC .............. *E21C 35/24* (2013.01); *E21C 31/08* (2013.01)

(58) Field of Classification Search
CPC .................................. E21C 31/08; E21C 35/24
See application file for complete search history.

(56) References Cited

U.S. PATENT DOCUMENTS

| | | | | |
|---|---|---|---|---|
| 3,719,394 A * | 3/1973 | Hartley | .................... | E21C 35/08 299/1.1 |
| 3,984,147 A * | 10/1976 | Gapper | .................... | E21C 25/06 299/1.1 |
| 4,262,964 A * | 4/1981 | Ingle | ........................ | E21C 27/00 175/41 |
| 5,087,099 A * | 2/1992 | Stolarczyk | ............... | E21C 35/24 299/1.6 |
| 5,500,649 A * | 3/1996 | Mowrey | .................. | E21C 35/24 342/22 |
| 2017/0159431 A1* | 6/2017 | Rimmington | ........... | E21C 27/02 |

* cited by examiner

*Primary Examiner* — Janine M Kreck
(74) *Attorney, Agent, or Firm* — Greensfelder, Hemker & Gale, P.C.; Richard C. Himelhoch

(57) ABSTRACT

An intelligent detection and recognition system and method for a coal-rock interface of a mine are provided. The intelligent detection and recognition system mainly includes an intelligent lifting support fastened to the top of a shearer, a non-contact radar antenna disposed at the top of the intelligent lifting support, and an operating terminal with which the radar antenna wirelessly conducts information transmission. In an operating state, a radiation direction of the radar antenna is perpendicular to the surface of a to-be-detected coal seam, and the operating terminal is configured to acquire radar data of the to-be-detected coal seam collected by the radar antenna, and draw and display a coal-rock horizon occurrence curve according to the radar data.

7 Claims, 4 Drawing Sheets

INTELLIGENT DETECTION AND RECOGNITION SYSTEM AND METHOD FOR COAL-ROCK INTERFACE OF MINE

CROSS-REFERENCE TO RELATED APPLICATIONS

The present invention claims priority to and the benefit of Chinese Patent Application No. 202010304390.7 filed Apr. 17, 2020, the contents of which are incorporated herein by reference and made a part hereof.

TECHNICAL FIELD

The present invention relates to the field of coal-rock interface recognition technologies, and in particular, to an intelligent detection and recognition system and method for a coal-rock interface of a mine.

BACKGROUND

Intelligent detection and recognition of a coal-rock interface of a mine is a major problem restricting intelligent coal mining. Undercutting/overcutting of a coal seam by a shearer will cause problems such as a waste of resources, reduction of a recovery rate, degradation of coal quality due to rock mixing, gear abrasion caused by rock cutting, and explosion caused by sparks generated in a high-gas area. As a result, it is difficult to deal with a sudden change in working conditions by adjusting a drum height depending on manual observation and experience-based judgment. An efficient intelligent detection and recognition technology for coal and rock is a core technology required to implement intelligent coal and rock cutting.

Actually, affected by geological conditions and environmental factors, occurrence conditions of a coal seam and rock strata are particularly complex, and the coal seam may contain gangue, fissure, gas, water, and other media. In addition, a coal-rock interface may change gradually or may suddenly change. Moreover, for detection of a coal-rock interface, a non-contact real-time detection further needs to be satisfied. This further increases the difficulty of coal and rock recognition. At present, an existing coal and rock detection technology is susceptible to disturbance of various environmental factors, and has no universality and timeliness in complex mining geological conditions. In other words, there is no perfect method to implement coal and rock recognition.

SUMMARY

An objective of the present invention is to provide an intelligent detection and recognition system and method for a coal-rock interface of a mine. This can not only improve the detection accuracy, but also adapt to a working environment that suddenly changes on a fully mechanized mining face.

To achieve the above objective, the present invention provides the following technical solutions:

An intelligent detection and recognition system for a coal-rock interface of a mine includes a radar antenna, an intelligent lifting support, and an operating terminal, where the radar antenna is disposed at the top of the intelligent lifting support, and in an operating state, a radiation direction of the radar antenna is perpendicular to the surface of a to-be-detected coal seam;

the bottom end of the intelligent lifting support is fastened to the top of a shearer; and the operating terminal wirelessly conducts information transmission with the radar antenna, and the operating terminal is configured to acquire radar data of the to-be-detected coal seam collected by the radar antenna, and draw and display a coal-rock horizon occurrence curve according to the radar data.

An intelligent detection and recognition method for a coal-rock interface of a mine includes:

acquiring and preprocessing radar data of a to-be-detected coal seam collected by a radar antenna, where preprocessed radar data includes multiple trace data sequences;

selecting a seed horizon point according to the preprocessed radar data;

conducting horizon tracing on the preprocessed radar data according to a trace correlation coefficient algorithm by using the seed horizon point as an initial reference center, and determining horizon-geographical coordinate information of all tracked trace data sequences and horizon-geographical coordinate information of an initial reference trace data sequence, where the initial reference trace data sequence uses the seed horizon point as a center; and drawing a coal-rock horizon occurrence curve according to the horizon-geographical coordinate information of all the tracked trace data sequences and the horizon-geographical coordinate information of the initial reference trace data sequence.

According to specific examples provided in the present invention, the present invention discloses the following technical effects:

The present invention provides an intelligent detection and recognition system and method for a coal-rock interface of a mine. A position of a non-contact radar antenna is adjusted by using an intelligent lifting support to accurately obtain radar data of a to-be-detected coal seam, and then a coal-rock horizon occurrence curve is drawn according to a related algorithm in an operating terminal. This can not only improve the detection accuracy, but also adapt to a working environment that suddenly changes on a fully mechanized mining face.

BRIEF DESCRIPTION OF DRAWINGS

To describe the technical solutions in the examples of the present invention or in the prior art more clearly, the following briefly describes the accompanying drawings required in the examples. Apparently, the accompanying drawings in the following description show some examples of the present invention, and a person of ordinary skill in the art may still derive other drawings from these accompanying drawings without creative efforts.

DETAILED DESCRIPTION

The following clearly and completely describes the technical solutions in the examples of the present invention with reference to the accompanying drawings in the examples of the present invention. Apparently, the described examples are some rather than all of the examples of the present invention. All other examples obtained by a person of ordinary skill in the art based on the examples of the present invention without creative efforts shall fall within the protection scope of the present invention.

In view of a current situation in which a coal and rock detection technology has low detection accuracy and is difficult to adapt to a working environment that suddenly changes on a fully mechanized mining face, the present invention provides an intelligent detection and recognition system and method for a coal-rock interface of a mine.

To make the objectives, features, and advantages of the present invention more obvious and easy to understand, the following further describes the present invention in details with reference to the accompanying drawings and specific implementations.

Figure 1:
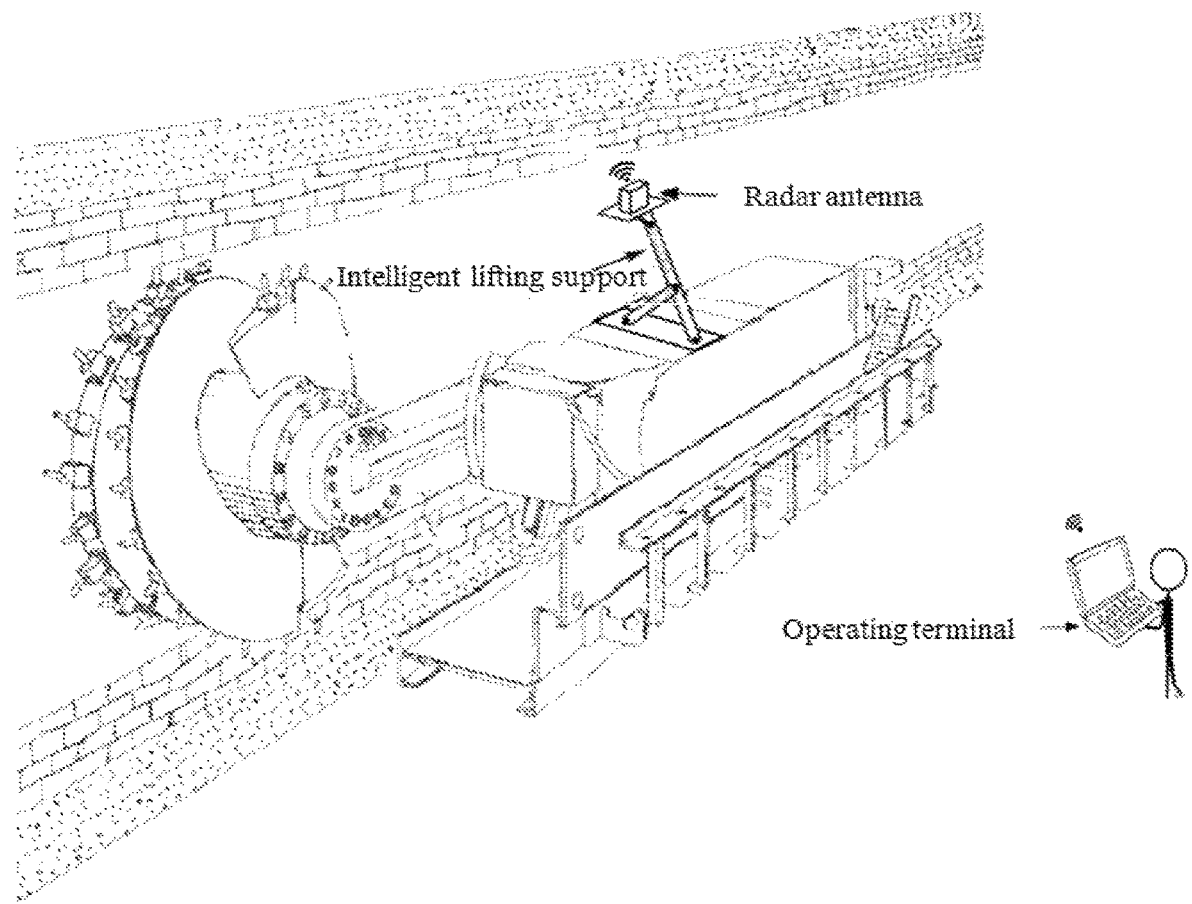
FIG. 1 is a structural diagram of an intelligent detection and recognition system for a coal-rock interface of a mine according to the present invention.
Figure 2:
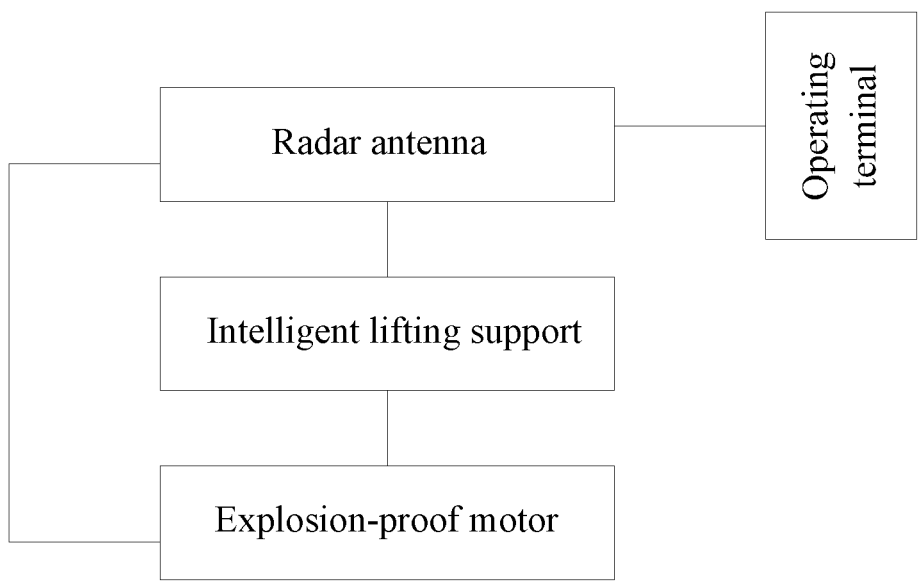
FIG. 2 is a block diagram of an intelligent detection and recognition system for a coal-rock interface of a mine according to the present invention.

As shown in FIG. 1 and FIG. 2, an intelligent detection and recognition system for a coal-rock interface of a mine provided in the present invention includes a radar antenna, an intelligent lifting support, an operating terminal, and a small explosion-proof motor.

The radar antenna is disposed at the top of the intelligent lifting support. In an operating state, a radiation direction of the radar antenna is perpendicular to the surface of a to-be-detected coal seam. The bottom end of the intelligent lifting support is fastened to the top of a shearer, and the small explosion-proof motor is further disposed at the top end of the shearer. The operating terminal is configured to acquire radar data of the to-be-detected coal seam collected by the radar antenna, and draw and display a coal-rock horizon occurrence curve according to the radar data.

A signal input end of the small explosion-proof motor is wirelessly connected to the radar antenna, and an output shaft of the small explosion-proof motor is connected to the intelligent lifting support.

A control signal of the small explosion-proof motor is from a data processing module of the radar antenna, where the data processing module can accurately recognize a distance between an upper surface of the radar antenna and the surface of the to-be-detected coal seam according to a coal-rock horizon recognition algorithm and the radar data collected by the radar antenna, and output a control signal of the explosion-proof motor according to the distance, so as to implement automatic adjustment of an upper position and a lower position of the radar antenna by controlling an operating state of the explosion-proof motor. To be specific, the small explosion-proof motor is configured to control the intelligent lifting support to work according to the control signal of the explosion-proof motor output by the data processing module of the radar antenna, to implement automatic adjustment of the upper position and the lower position of the radar antenna.

The operating terminal includes a collection control subsystem and a human-computer interaction interface. The collection control subsystem can implement functions such as collection parameter setting, collection process control, automatic recognition and manual correction of coal-rock horizon seed points, coal-rock horizon tracing and information extraction, and data display and storage. To be specific, the collection control subsystem includes a microcontroller, a data acquisition module, a data processing module, and a storage module; the microcontroller is configured to cooperate with each module in the collection control subsystem in its operation and control display information of the human-computer interaction interface; the data acquisition module is configured to acquire the radar data of the to-be-detected coal seam collected by the radar antenna; the data processing module includes a preprocessing unit, a seed horizon selection unit, a seed horizon tracing unit, and a coal-rock horizon occurrence curve drawing unit; the preprocessing unit is configured to preprocess the radar data; the seed horizon selection unit is configured to select a seed horizon point according to preprocessed radar data; the seed horizon tracing unit is configured to conduct horizon tracing on the preprocessed radar data according to a trace correlation coefficient algorithm by using the seed horizon point as an initial reference center, and determine horizon-geographical coordinate information of all tracked trace data sequences and horizon-geographical coordinate information of an initial reference trace data sequence; the initial reference trace data sequence uses the seed horizon point as a center; the coal-rock horizon occurrence curve drawing unit is configured to draw a coal-rock horizon occurrence curve according to the horizon-geographical coordinate information of all the tracked trace data sequences and the horizon-geographical coordinate information of the initial reference trace data sequence; and the storage module is configured to store a data collection parameter and the coal-rock horizon occurrence curve.

In addition, the human-computer interaction interface of the operating terminal can further implement drawing and display of a coal-rock horizon contour line in real time.

Figure 3:
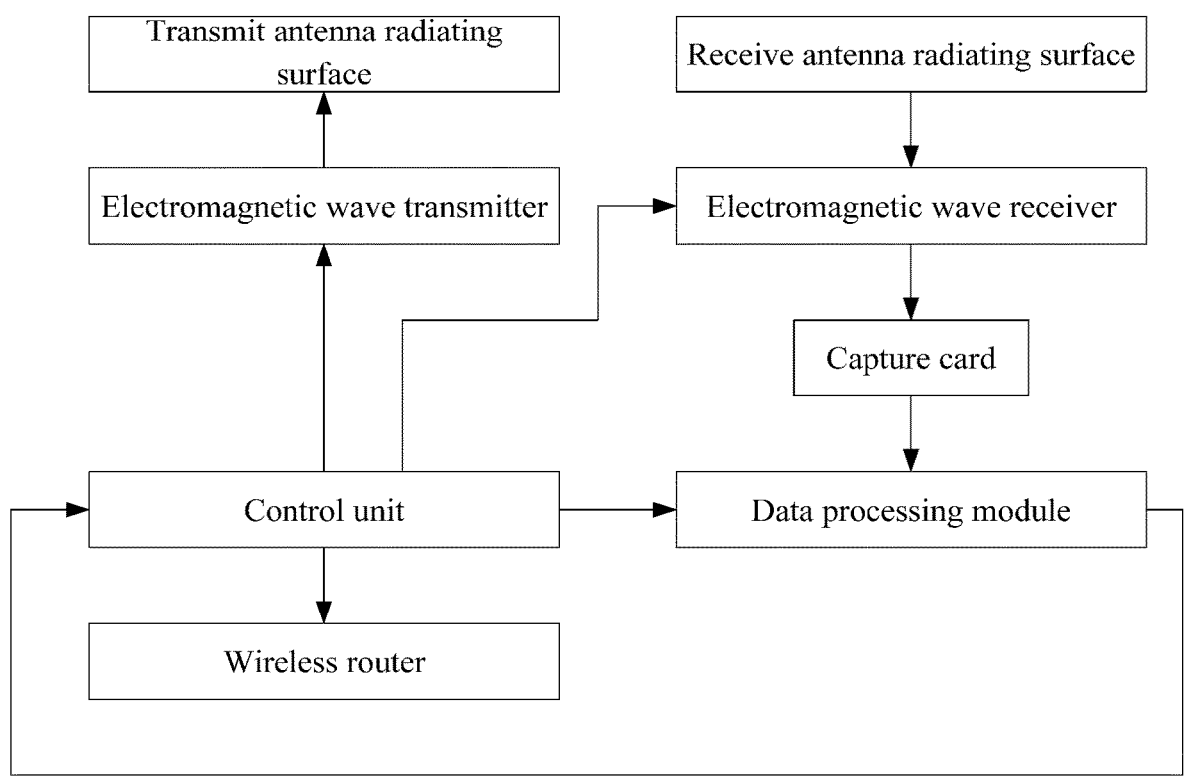
FIG. 3 is a schematic diagram of a connection relationship between components inside a radar antenna according to the present invention.

The radar antenna includes a closed housing and components that are disposed inside the housing, for example, a transmit antenna radiating surface, a receive antenna radiating surface, an electromagnetic wave transmitter, an electromagnetic wave receiver, a capture card, a data processing module, a control unit, and a wireless router. A connection relationship between the components inside the radar antenna is shown in FIG. 3. The transmit antenna radiating surface is connected to an output end of the electromagnetic wave transmitter; an input end of the electromagnetic wave transmitter is connected to a first output end of the control unit; the receive antenna radiating surface is connected to a first input end of the electromagnetic wave receiver; a second output end of the control unit is connected to a second input end of the electromagnetic wave receiver; an output end of the electromagnetic wave receiver is connected to an input end of the capture card; an output end of the capture card is connected to a first input end of the data processing module; a third output end of the control unit is connected to a second input end of the data processing module; an output end of the data processing module is connected to an input end of the control unit; and a fourth output end of the control unit is connected to the wireless router. The housing is a rectangular box, and is made of a non-metallic material. The housing has sufficient strength, and causes no influence on electromagnetic wave radiation while protecting the components inside the radar antenna.

The intelligent lifting support is made of a metal material and has high-strength bending resistance, and a height of the top end of the intelligent lifting support is manually controlled and adjusted through a screw rod and an axle on the intelligent lifting support.

The operating terminal may be a device such as an explosion-proof tablet computer, an explosion-proof mobile phone, or an explosion-proof server, and all the devices may wirelessly conduct information transmission with the radar antenna.

A main function of the system is to conduct data collection and real-time processing while the shearer is operating normally, so as to dynamically acquire coal-rock interface information, and implement intelligent detection and recognition of the coal-rock interface in the mine.

Figure 4:
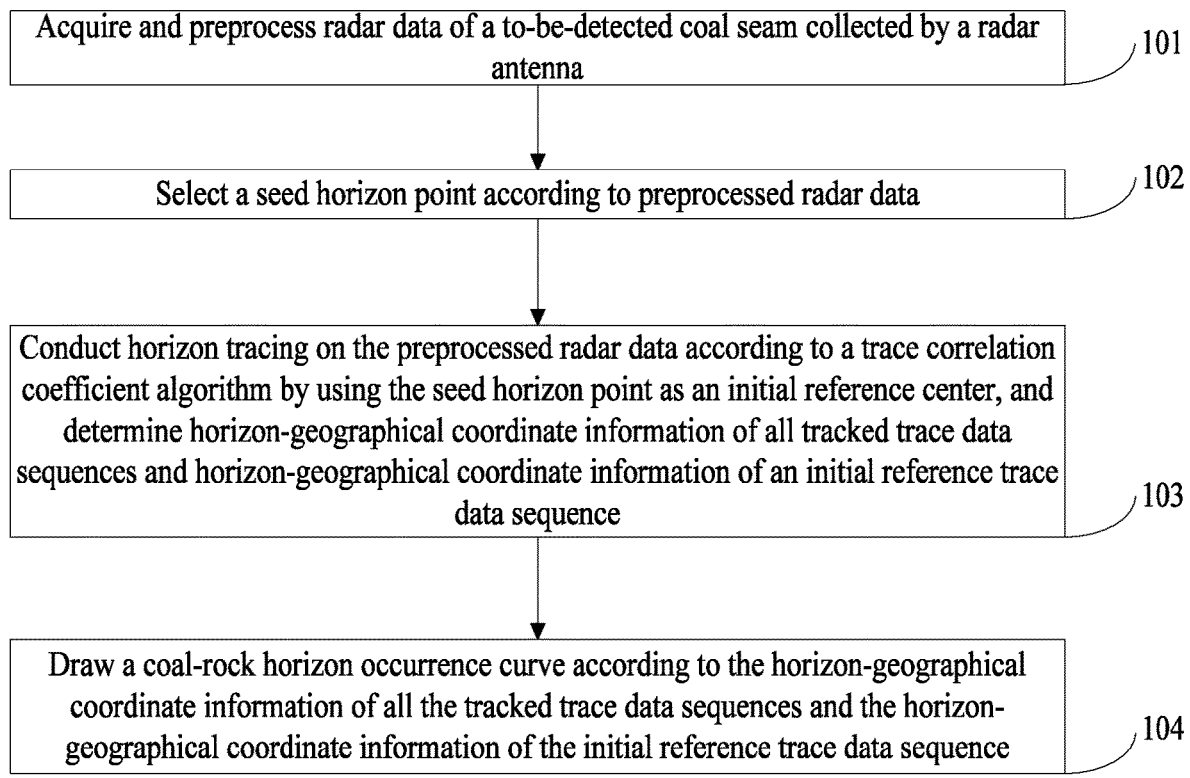
FIG. 4 is a flowchart of an intelligent detection and recognition method for a coal-rock interface of a mine according to the present invention.

To achieve the above objective, as shown in FIG. 4, the present invention further provides an intelligent detection and recognition method for a coal-rock interface of a mine, including the following steps:

Step 101. Acquire and preprocess radar data of a to-be-detected coal seam collected by a radar antenna, where preprocessed radar data includes multiple trace data sequences. The step specifically includes:

conducting image enhancement processing on the collected radar data, where the image enhancement processing includes background denoising, one-dimensional filtering, automatic gain control, and trace superposition processing, etc., so as to highlight horizon information; and conducting data offset processing on the radar data that has undergone image enhancement processing.

The data offset processing is used to eliminate influence of diffracted wave interference, etc. The data offset processing means selecting an appropriate offset velocity v(cm/ns) to conduct offset processing on the radar data that has undergone image enhancement processing, to implement reflected wave migration and diffracted wave convergence, so as to increase a transverse resolution of the radar data. The offset velocity is determined in advance through measurement and calculation. During the data offset processing, it is required to separate an air medium and conduct offset processing on only a medium in the coal seam.

Step 102. Select a seed horizon point according to the preprocessed radar data. The seed horizon point can be tracked only after the seed horizon point is selected. A method for selecting the seed horizon point includes an automatic machine selection method and a manual selection method.

The automatic machine selection method means selecting the seed horizon point through calculation by using a special algorithm, and the algorithm includes the following steps:

(1) Select any trace data sequence from the preprocessed radar data, and determine a trace number corresponding to the selected data sequence, where the trace number corresponding to the selected data sequence is denoted as $T_0$. A direct wave is an electromagnetic wave that is sent from a transmit antenna of a ground penetrating radar and that directly reaches a receive antenna without reflection and refraction, and a characteristic of the direct wave is that a signal amplitude value is the largest. Therefore, a position of the first amplitude jump point starting from 0 is a position of the direct wave. The number of sample points of the direct wave is denoted as $N_0$.

(2) Determine a position of an air-coal horizon and the number $N_1$ of sample points of the air-coal horizon.

An established coal-rock classification model is applied to implement accurate recognition of the air-coal horizon, so as to determine the position of the air-coal horizon and the number $N_1$ of sample points of the air-coal horizon.

Assuming that a hanging height of the radar antenna is $H_0$, a sampling time window is T, a sampling rate is N, and a propagation velocity of an electromagnetic wave in air is V, the number $N_1$ of sample points of the air-coal horizon is calculated according to the formula (1).

$$N_1 = \frac{2 \times H_0 \times (N-1)}{V \times T} + N_0 \qquad (1)$$

(3) Determine a position of a coal-rock horizon and the number $N_2$ of sample points of the coal-rock horizon.

For a seed trace data sequence set (that is, the preprocessed radar data), the coal-rock horizon is located below the air-coal horizon. Starting from the number $N_1$ of sample points of the air-coal horizon, the established coal-rock classification model is applied to implement accurate recognition of the coal-rock horizon, so as to determine the position of the coal-rock horizon and the number $N_2$ of sample points of the coal-rock horizon.

Assuming that a coal seam height is $H_1$, and a propagation velocity of a magnetic wave in a coal seam is $V_1$, the number $N_2$ of sample points of the coal-rock horizon is calculated according to a formula (2).

$$N_2 = \frac{2 \times H_1 \times (N-1)}{V_1 \times T} + N_1 \qquad (2)$$

Coordinate information of the seed horizon point is determined according to the number of sample points of the coal-rock horizon and the trace number corresponding to the selected data sequence, that is, a position point $(T_0, N_2)$ corresponding to the preprocessed radar data is the seed horizon point. The position of the coal-rock horizon and the number of sample points of the coal-rock horizon are extremely important, and are used to calculate a height Y of the coal-rock horizon.

The manual selection method means that an operator directly selects the seed horizon point from the operating terminal device.

Step 103. Conduct horizon tracing on the preprocessed radar data according to a trace correlation coefficient algorithm by using the seed horizon point as an initial reference center, and determine horizon-geographical coordinate information of all tracked trace data sequences and horizon-geographical coordinate information of an initial reference trace data sequence. The initial reference trace data sequence uses the seed horizon point as a center. The step specifically includes:

The horizon tracing refers to real-time horizon tracing conducted according to the trace correlation coefficient algorithm by using the seed horizon point $(T_0, N_2)$ as an initial reference center. $(T_0, N_2)$ is used as a center of a reference trace data sequence. It is assumed that x(m) and y(n) are respectively the reference trace data sequence and a tracked trace data sequence, where m and n are lengths of the data sequences, and n>m. Specific operation steps are as follows:

Data selected for the reference trace data sequence is determined by using the seed horizon point as the center of the reference trace data sequence and a specified step as a data selection window.

A correlation coefficient of the data selected for the reference trace data sequence and the tracked trace data sequence is calculated according to a formula (3) and the trace correlation coefficient algorithm by using a data sequence adjacent to the reference trace data sequence as the tracked trace data sequence, and position information of a point number, corresponding to a maximum correlation coefficient, of the tracked trace data sequence is determined as horizon coordinates of the tracked trace data sequence. The horizon coordinates include an abscissa value X and an ordinate value Y, where the abscissa value X is a trace number, and the ordinate value Y is a height of the coal-rock horizon, that is, $N_2$.

$$\rho_{xy} = \frac{\sum_{n=0}^{N-1} x(m)y(n)}{\sqrt{\left[\sum_{n=0}^{N-1} x^2(m) \sum_{n=0}^{N-1} y^2(n)\right]}} \quad (3)$$

$\rho_{xy}$ is a correlation coefficient, and N is a sampling point number.

Correlation analysis is as follows: Correlation calculation on a reference trace and a tracked trace is conducted from the first point on an upper boundary of a window of a data sequence selected from the tracked trace to the last point of a lower boundary of the window.

The center of the reference trace data sequence is updated to the horizon coordinates of the tracked trace data sequence, the reference trace data sequence is updated to the tracked trace data sequence, returning to the step of determining data selected for the reference trace data sequence is conducted, and loop iteration is conducted until horizon coordinate information of all the tracked trace data sequences is determined. During tracing of horizon coordinate information, when the tracked horizon coordinate information is far out of a specified range, the horizon coordinate information is adjusted by using a manual correction method.

The horizon-geographical coordinate information of all the tracked trace data sequences is calculated according to the horizon coordinate information of all the tracked trace data sequences by using position information of an intelligent lifting support and hanging height information of the radar antenna as reference values.

Similarly, the horizon-geographical coordinate information of the initial the reference trace data sequence is determined through calculation according to horizon coordinate information of the initial reference trace data sequence by using the position information of the intelligent lifting support and the hanging height information of the radar antenna as the reference values.

A method for calculating a geographical abscissa value X(m) corresponding to each trace data sequence is as follows: When data collection is conducted in a mine, marking is conducted according to a position of intelligent lifting support, and then an abscissa value corresponding to any trace data sequence Tr can be calculated according to a distance D between two intelligent lifting supports corresponding to a marking point.

1. Assuming that the first marking point is a starting point, numbers of adjacent marking points before and after Tr are respectively N1 and N2 and that trace numbers of data sequences corresponding to N1 and N2 is Tr1 and Tr2, $$X = (N1-1)*D + \frac{D*Tr}{Tr2-Tr1} \quad (4)$$

A geographical coordinate value Y(m) corresponding to each trace data sequence is calculated by using the following method: Assuming that a relative dielectric constant of coal is $\varepsilon_r$, $$Y = \frac{30 \times (N_2 - N_1) \times T}{2 \times (N-1)\sqrt{\varepsilon_r}} + H_0 \quad (5)$$

The hanging height $H_0$ of the radar antenna varies with the fluctuation of the coal seam, and a range of the change is usually within 20 cm. The hanging height $H_0$ of the radar antenna is calculated by using the following method: According to a method for recognizing a coal-rock horizon in a mine, a position of a direct wave corresponding to a single data sequence and the number $N_0$ of sample points of the direct wave, and a position of an air-coal horizon and the number $N_1$ of sample points of the air-coal horizon can be determined, and the hanging height $H_0$ of the radar antenna can be acquired according to a time difference between the air-coal horizon and the direct wave and a propagation velocity of an electromagnetic wave in air. A calculation formula thereof is as follows:

$$H_0 = \frac{(N_1 - N_0)*V*T}{2(N-1)} \quad (6)$$

Step 104. Draw a coal-rock horizon occurrence curve according to the horizon-geographical coordinate information of all the tracked trace data sequences and the horizon-geographical coordinate information of the initial reference trace data sequence.

A coal-rock horizon contour line is a changing curve of the coal-rock horizon that is drawn when a geographical abscissa value X(m) corresponding to each trace data sequence of the preprocessed radar data and a geographical height Y(m) of the coal-rock horizon are acquired.

In the present invention, coal-rock interface information within 1 m can be acquired in real time and a cutting state (coal cutting/rock cutting) of a shearer can be determined by using the non-contact radar antenna. The detection accuracy reaches 2 cm. In this way, a drum lifting policy can be effectively developed, providing technical support for intelligent coal mine mining.

Each example of the present specification is described in a progressive manner, each example focuses on the difference from other examples, and mutual reference may be made for the same and similar parts between the examples.

In this specification, specific examples are used for illustration of the principles and examples of the present invention. The description of the foregoing examples is used to help understand the method of the present invention and the core principles thereof. In addition, a person skilled in the art can make various modifications in terms of specific examples and scope of application in accordance with the teachings of the present invention. In conclusion, the content of this specification should not be construed as a limitation to the present invention.

What is claimed is:

1. An intelligent detection and recognition system for a coal-rock interface of a mine, comprising a radar antenna, an intelligent lifting support, and an operating terminal, and an explosion-proof motor disposed at the top end of the shearer, wherein
   the radar antenna is disposed at the top of the intelligent lifting support, and in an operating state, a radiation direction of the radar antenna is perpendicular to the surface of a to-be-detected coal seam;
   the bottom end of the intelligent lifting support is fastened to the top of a shearer;
   the operating terminal wirelessly conducts information transmission with the radar antenna, and the operating terminal is configured to acquire radar data of the to-be-detected coal seam collected by the radar antenna, and draw and display a coal-rock horizon occurrence curve according to the radar data;

a signal input end of the explosion-proof motor is wirelessly connected to the radar antenna, and an output shaft of the explosion-proof motor is connected to the intelligent lifting support;

a first processor of the radar antenna is configured to determine a distance between an upper surface of the radar antenna and the surface of the to-be-detected coal seam according to a coal-rock horizon recognition algorithm and the radar data, and output a control signal of the explosion-proof motor according to the distance; and the explosion-proof motor is configured to control the intelligent lifting support to work according to the control signal of the explosion-proof motor output by the first processor, to implement automatic adjustment of an upper position and a lower position of the radar antenna.

2. The intelligent detection and recognition system for a coal-rock interface of a mine according to claim 1, wherein the radar antenna comprises a closed housing, and a transmit antenna radiating surface, a receive antenna radiating surface, an electromagnetic wave transmitter, an electromagnetic wave receiver, a capture card, the first processor, a control unit, and a wireless router that are disposed inside the housing; the transmit antenna radiating surface is connected to an output end of the electromagnetic wave transmitter; an input end of the electromagnetic wave transmitter is connected to a first output end of the control unit; the receive antenna radiating surface is connected to a first input end of the electromagnetic wave receiver; a second output end of the control unit is connected to a second input end of the electromagnetic wave receiver; an output end of the electromagnetic wave receiver is connected to an input end of the capture card; an output end of the capture card is connected to a first input end of the first processor; a third output end of the control unit is connected to a second input end of the first processor; an output end of the first processor is connected to an input end of the control unit; and a fourth output end of the control unit is connected to the wireless router.

3. The intelligent detection and recognition system for a coal-rock interface of a mine according to claim 2, wherein the housing is a rectangular box, and is made of a non-metallic material.

4. The intelligent detection and recognition system for a coal-rock interface of a mine according to claim 1, wherein the operating terminal comprises a collection control subsystem and a human-computer interaction interface;

the collection control subsystem comprises a microcontroller, a data acquisition module, a second processor, and a storage module; the microcontroller is configured to cooperate with each module in the collection control subsystem in its operation and control display information of the human-computer interaction interface; the data acquisition module is configured to acquire the radar data of the to-be-detected coal seam collected by the radar antenna;

the second processor comprises a preprocessing unit, a seed horizon selection unit, a seed horizon tracing unit, and a coal-rock horizon occurrence curve drawing unit; the preprocessing unit is configured to preprocess the radar data; the seed horizon selection unit is configured to select a seed horizon point according to preprocessed radar data; the seed horizon tracing unit is configured to conduct horizon tracing on the preprocessed radar data according to a trace correlation coefficient algorithm by using the seed horizon point as an initial reference center, and determine horizon-geographical coordinate information of all tracked trace data sequences and horizon-geographical coordinate information of an initial reference trace data sequence; the initial reference trace data sequence uses the seed horizon point as a center; the coal-rock horizon occurrence curve drawing unit is configured to draw a coal-rock horizon occurrence curve according to the horizon-geographical coordinate information of all the tracked trace data sequences and the horizon-geographical coordinate information of the initial reference trace data sequence; and the storage module is configured to store a data collection parameter and the coal-rock horizon occurrence curve; and the human-computer interaction interface is configured to display the coal-rock horizon occurrence curve.

5. The intelligent detection and recognition system for a coal-rock interface of a mine according to claim 1, wherein the intelligent lifting support is made of a metallic material with bending resistance, and the operating terminal is an explosion-proof tablet computer, an explosion-proof mobile phone, or an explosion-proof server.

6. An intelligent detection and recognition system for a coal-rock interface of a mine, comprising a radar antenna, an intelligent lifting support, and an operating terminal, wherein:

the radar antenna is disposed at the top of the intelligent lifting support, and in an operating state, a radiation direction of the radar antenna is perpendicular to the surface of a to-be-detected coal seam;

wherein the radar antenna comprises a closed housing, and a transmit antenna radiating surface, a receive antenna radiating surface, an electromagnetic wave transmitter, an electromagnetic wave receiver, a capture card, a first processor, a control unit, and a wireless router that are disposed inside the housing;

the transmit antenna radiating surface is connected to an output end of the electromagnetic wave transmitter;

an input end of the electromagnetic wave transmitter is connected to a first output end of the control unit the receive antenna radiating surface is connected to a first input end of the electromagnetic wave receiver;

a second output end of the control unit is connected to a second input end of the electromagnetic wave receiver;

an output end of the electromagnetic wave receiver is connected to an input end of the capture card;

an output end of the capture card is connected to a first input end of the first processor;

a third output end of the control unit is connected to a second input end of the first processor;

an output end of the first processor is connected to an input end of the control unit and a fourth output end of the control unit is connected to the wireless router;

the bottom end of the intelligent lifting support is fastened to the top of a shearer; and the operating terminal wirelessly conducts information transmission with the radar antenna, and the operating terminal is configured to acquire radar data of the to-be-detected coal seam collected by the radar antenna, and draw and display a coal-rock horizon occurrence curve according to the radar data.

7. An intelligent detection and recognition system for a coal-rock interface of a mine, comprising a radar antenna, an intelligent lifting support, and an operating terminal, wherein:

the radar antenna is disposed at the top of the intelligent lifting support, and in an operating state, a radiation direction of the radar antenna is perpendicular to the surface of a to-be-detected coal seam;

the bottom end of the intelligent lifting support is fastened to the top of a shearer; and the operating terminal wirelessly conducts information transmission with the radar antenna, and the operating terminal is configured to acquire radar data of the to-be-detected coal seam collected by the radar antenna, and draw and display a coal-rock horizon occurrence curve according to the radar data;

wherein the operating terminal comprises a collection control subsystem and a human- computer interaction interface;

the collection control subsystem comprises a microcontroller, a data acquisition module, a data processing module, and a storage module; the microcontroller is configured to cooperate with each module in the collection control subsystem in its operation and control display information of the human-computer interaction interface; the data acquisition module is configured to acquire the radar data of the to-be-detected coal seam collected by the radar antenna; the data processing module comprises a preprocessing unit, a seed horizon selection unit, a seed horizon tracing unit, and a coal-rock horizon occurrence curve drawing unit the preprocessing unit is configured to preprocess the radar data; the seed horizon selection unit is configured to select a seed horizon point according to preprocessed radar data; the seed horizon tracing unit is configured to conduct horizon tracing on the preprocessed radar data according to a trace correlation coefficient algorithm by using the seed horizon point as an initial reference center, and determine horizon-geographical coordinate information of all tracked trace data sequences and horizon-geographical coordinate information of an initial reference trace data sequence; the initial reference trace data sequence uses the seed horizon point as a center; the coal-rock horizon occurrence curve drawing unit is configured to draw a coal-rock horizon occurrence curve according to the horizon-geographical coordinate information of all the tracked trace data sequences and the horizon-geographical coordinate information of the initial reference trace data sequence; and the storage module is configured to store a data collection parameter and the coal-rock horizon occurrence curve; and the human-computer interaction interface is configured to display the coal-rock horizon occurrence curve.

* * * * *